(12) United States Patent
D'Uston De Villereglan et al.

(10) Patent No.: US 8,644,446 B2
(45) Date of Patent: Feb. 4, 2014

(54) SPACER GRID WITH SADDLE-SHAPED SUPPORTS AND CORRESPONDING NUCLEAR FUEL ASSEMBLY

(75) Inventors: Berenger D'Uston De Villereglan, Lynchburg, VA (US); Claude Bois, Villeurbanne (FR); Bruno Bonnamour, Villeurbanne (FR); Michel Bonnamour, Lyons (FR)

(73) Assignee: Areva NP, Courbevoie (FR)

( * ) Notice: Subject to any disclaimer, the term of this patent is extended or adjusted under 35 U.S.C. 154(b) by 835 days.

(21) Appl. No.: 12/448,586

(22) PCT Filed: Dec. 18, 2007

(86) PCT No.: PCT/FR2007/002098
§ 371 (c)(1),
(2), (4) Date: Jun. 25, 2009

(87) PCT Pub. No.: WO2008/090289
PCT Pub. Date: Jul. 31, 2008

(65) Prior Publication Data
US 2009/0296876 A1 Dec. 3, 2009

(30) Foreign Application Priority Data
Dec. 26, 2006 (FR) ...................................... 06 11381

(51) Int. Cl.
*G21C 3/34* (2006.01)
(52) U.S. Cl.
USPC ........... 376/442; 376/438; 376/434; 376/426; 376/409

(58) Field of Classification Search
USPC ................. 376/207, 210, 243, 347, 361–363, 376/438–444, 462
See application file for complete search history.

(56) References Cited

U.S. PATENT DOCUMENTS

| | | | |
|---|---|---|---|
| 4,702,881 A | 10/1987 | Weiland et al. | |
| 4,803,043 A | 2/1989 | DeMario et al. | |
| 4,957,697 A | 9/1990 | Wada | |
| 5,183,629 A | 2/1993 | Canat et al. | |
| 5,243,635 A | 9/1993 | Bryan | |
| 5,793,832 A | 8/1998 | Lettau | |
| 6,606,369 B1 | 8/2003 | Smith, III et al. | |
| 2004/0086072 A1 | 5/2004 | Kang et al. | |
| 2005/0226358 A1* | 10/2005 | Bonnamour et al. | ......... 376/438 |

FOREIGN PATENT DOCUMENTS

| | | |
|---|---|---|
| DE | 2364349 | 6/1975 |
| EP | 0196598 | 10/1986 |
| EP | 1416500 | 5/2004 |
| FR | 2028039 | 10/1970 |
| FR | 2065721 | 8/1971 |

(Continued)

*Primary Examiner* — Jack W Keith
*Assistant Examiner* — Marshall O'Connor
(74) *Attorney, Agent, or Firm* — Davidson, Davidson & Kappel, LLC

(57) ABSTRACT

A spacer grid for a nuclear fuel assembly for a light water reactor delimits a substantially regular array of cells housing nuclear fuel rods. The spacer grid further including supporting members which project into the cells from the peripheral belt of walls. The inner surface of at least one supporting member has before irradiation a concave shape in a plane transverse to the longitudinal direction. The inner surface of the contact part of the supporting member also has a convex shape in a longitudinal plane orientated radially with respect to the central axis of the corresponding cell before irradiation.

9 Claims, 3 Drawing Sheets

(56) References Cited

FOREIGN PATENT DOCUMENTS

| | | | |
|---|---|---|---|
| FR | 2531258 | | 2/1984 |
| FR | 2837975 | | 10/2003 |
| GB | 1302060 | | 1/1973 |
| GB | 1482765 | * | 8/1977 |
| JP | 62043592 | | 2/1987 |
| JP | 1-173898 | | 7/1989 |
| JP | 2-21597 | | 2/1990 |

* cited by examiner

SPACER GRID WITH SADDLE-SHAPED SUPPORTS AND CORRESPONDING NUCLEAR FUEL ASSEMBLY

The invention relates to a spacer grid for a nuclear fuel assembly for a light water reactor, the nuclear fuel assembly comprising nuclear fuel rods extending along a longitudinal direction, the spacer grid being of the type forming a substantially regular array of cells housing nuclear fuel rods, each cell being surrounded by a peripheral belt of walls and having a central longitudinal axis which is intended to be substantially the same as the axis of a nuclear fuel rod intended to be housed in the cell, the spacer grid further comprising supporting members projecting from the peripheral belt of walls into the cells, the supporting members comprising contact parts whose surfaces orientated towards the interior of the cells are intended to come into contact with nuclear fuel rods, the inner surface of at least one supporting member having a concave shape in a plane transverse to the longitudinal direction before irradiation.

BACKGROUND

Light-water-cooled nuclear reactors, and in particular nuclear reactors cooled by pressurized water, use nuclear fuel assemblies comprising fuel rods which extend along the longitudinal direction and which are held in a bundle by a skeleton assembly. Each rod comprises cladding within which the nuclear fuel pellets are stacked.

The skeleton assembly of a nuclear fuel assembly in particular comprises a plurality of spacer grids distributed over the length of the bundle of rods.

Spacer grids ensure that the rods are held in place transversely and each comprise a set of adjacent cells arranged in a substantially regular array, generally a square grid. The cells themselves have a cross-section of square shape in a plane transverse to the spacer grid.

Each of the cells is delimited and separated from adjacent cells by a peripheral belt of walls having the shape of the lateral surface of a rectangular solid on a square base.

The cells of the spacer grid are open at their two longitudinal extremities so as to receive a rod in a generally central arrangement, in which arrangement the axis of the rod is located along the axis of the cell.

Furthermore, the nuclear fuel rods have a diameter which is substantially smaller than the size of the cells, so that there is a free space around each rod, between the outer surface of the rod and the peripheral wall of the cell in which the rod is longitudinally fitted.

In each of the cells intended to house a fuel rod the spacer grid comprises supporting members which are intended to come into contact with the outer surface of the corresponding fuel rod. The supporting members hold the rod in place in transverse directions perpendicular to the axis of the rod and the cell and in the longitudinal direction, while permitting limited longitudinal movement of the rod, for example through the effect of expansion within the core of the nuclear reactor.

The supporting members comprise rigid dimples and/or resilient dimples and/or springs.

These members project within the cells with which they are associated and are made by cutting and pressing out the peripheral belts of the walls, or are attached to and secured to the latter.

Supporting members which are orientated longitudinally, as for example described in document U.S. Pat. No. 5,793,832, or transversely, as described in document U.S. Pat. No. 5,183,629, or again obliquely, as for example described in document U.S. Pat. No. 4,803,043, are known.

Each supporting member comes into contact with the outer surface of the corresponding fuel rod through the surface of a contact part, this surface being orientated towards the interior of the cell in question.

This inner surface is generally flat so that the contact with the nuclear fuel rod is theoretically a cylinder/plane contact.

When the nuclear reactor is in operation, the cooling water, which circulates in the core with a large upward velocity, causes small amplitude oscillating movements in the nuclear fuel rods within the spacer grids. This phenomenon, known as "fretting", will result in friction between the nuclear fuel rods and the contact parts which may give rise to wear of the nuclear fuel rod cladding. This wear may cause the fuel rod cladding to be pierced and therefore gases and radioactive materials to be released into the water of the primary circuit, which may result in shutdown of the reactor for the premature removal of fuel assemblies which include defective rods.

In order to reduce these risks, document U.S. Pat. No. 5,243,635 describes a grid of the aforesaid type. The inner surfaces of the contact parts of the supporting members have transverse concavity of the same radius of curvature as the outer surfaces of the rods. This transverse concavity makes it possible to envelop the outer surface of the nuclear fuel rod cladding and thus increase the area of the effective contact areas with the rods and therefore reduce the risk of damaging the cladding by fretting.

However, differences from nominal dimensions and positions which necessarily arise in manufactured spacer grids because of manufacturing tolerances result in changes in the relative positions of the parts in contact in relation to the outer surfaces of the nuclear fuel rods. Contact can therefore be established in an uncontrolled way, for example through the lower, upper or side edges of the contact area, in particular when the surface of the contact part is not tangent upon the surface of the fuel rod, and this can lead to rapid damage of the rod cladding by fretting.

SUMMARY OF THE INVENTION

An object of the invention is to overcome this problem by providing a spacer grid of the aforesaid type through which the risk of damage to the nuclear fuel rods by fretting can be limited and whose efficiency is less sensitive to manufacturing tolerances for the spacer grid and the fuel rods.

The invention provides a spacer grid of the aforesaid type, characterized in that the inner surface of the contact part of the said supporting member additionally has a convex shape in a longitudinal plane orientated radially with respect to the central axis of the corresponding cell before irradiation.

According to particular embodiments, the spacer grid may comprise one or more of the following features taken in isolation or in all technically possible combinations:
- the inner surface of the said supporting member has, before irradiation, a convex shape in a longitudinal plane orientated radially with respect to the central axis of the cell with a longitudinal radius of curvature of less than 1000 mm,
- the longitudinal radius of curvature lies between $H/2$ and $4H^2$ where $H$ is the height along the longitudinal direction of the inner surface of the said supporting member,
- the inner surface of the said supporting member has, before irradiation, a concave shape in a plane transverse to the longitudinal direction with a transverse radius of curvature which is greater than the transverse radius of curvature of the outer surface of the nuclear fuel rods, the transverse radius of curvature of the inner surface is strictly greater than 1.05 times the transverse radius of curvature of the outer surface of the nuclear fuel rods, the transverse radius of curvature of the inner surface is strictly greater than 1.15 times the transverse radius of curvature of the outer surface of the nuclear fuel rods, the transverse radius of curvature of the inner surface is strictly greater than 1.25 times the transverse radius of curvature of the outer surface of the nuclear fuel rods, the said supporting member comprises a section forming a helical blade stirring the cooling fluid in the nuclear reactor, the said helical blade being substantially centered on the central axis of the corresponding cell, the said helical blade connects the contact part to the peripheral belt of the wall of the corresponding cell, the contact part is folded in relation to the helical blade which is itself folded in relation to the peripheral belt of the wall.

Another embodiment of the invention provides to a nuclear fuel assembly for light water reactors comprising nuclear fuel rods extending along a longitudinal direction and a skeleton assembly holding the nuclear fuel rods in place, the skeleton assembly comprising spacer grids, each spacer grid being of the type delimiting a substantially regular array of cells housing nuclear fuel rods, each cell being surrounded by a peripheral belt of walls and having a central longitudinal axis which is substantially the same as the axis of a nuclear fuel rod housed in the cell, each spacer grid further having supporting members which project from the peripheral belt of walls within the cells, the supporting members comprising contact parts whose surfaces orientated towards the interior of the cells abut against the nuclear fuel rods, the inner surface of at least one supporting member having, before irradiation, a concave shape in a plane transverse to the longitudinal direction, characterized in that at least one spacer grid is a spacer grid as defined above.

According to particular embodiments, the assembly may comprise one or more of the following features taken in isolation or in accordance with all technically possible combinations:

the inner surface of the said supporting member has, before irradiation, a concave shape in a plane transverse to the longitudinal direction with a transverse radius of curvature which is greater than the transverse radius of curvature of the outer surface of the nuclear fuel rods housed in the corresponding cell, the transverse radius of curvature of the inner surface is strictly greater than 1.05 times the transverse radius of curvature of the outer surface of the nuclear fuel rod housed in the corresponding cell, the transverse radius of curvature of the inner surface is strictly greater than 1.15 times the transverse radius of curvature of the outer surface of the nuclear fuel rod housed in the corresponding cell, and the transverse radius of curvature of the inner surface is strictly greater than 1.25 times the transverse radius of curvature of the outer surface of the nuclear fuel rod housed in the corresponding cell.

BRIEF DESCRIPTION OF THE DRAWINGS

Other features and advantages of the invention will be apparent from the detailed description provided below by way of indication and not in any way restrictively with reference to the appended figures in which.

DETAILED DESCRIPTION

Figure 1:
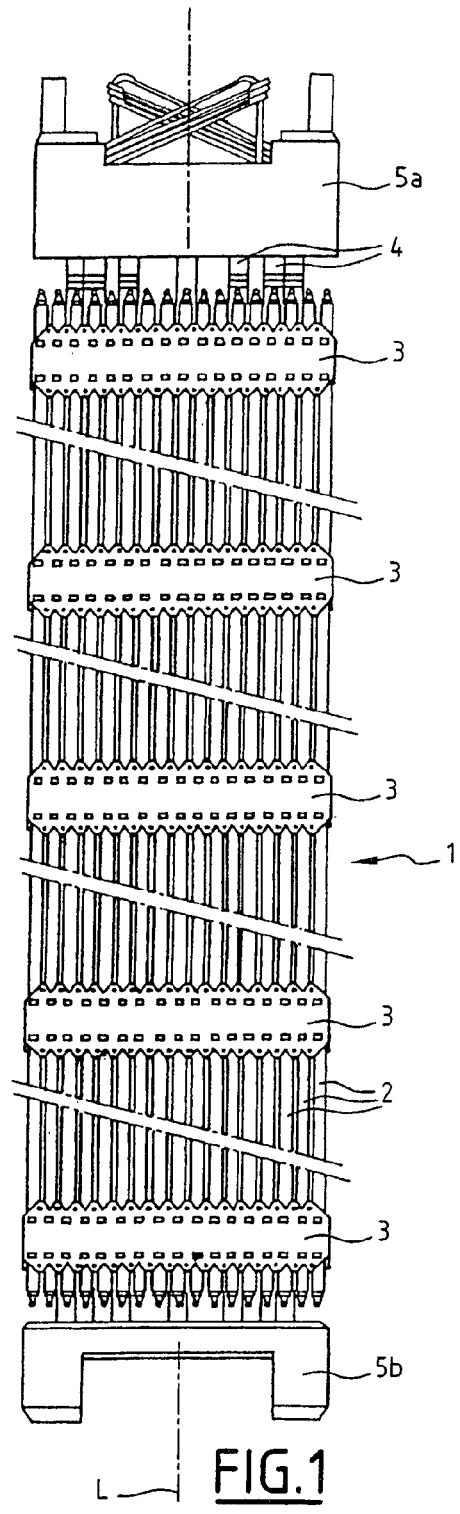
FIG. 1 is an elevation view of a nuclear fuel assembly in a pressurized-water-cooled nuclear reactor.

FIG. 1 shows a nuclear fuel assembly 1 for a pressurized-water-cooled nuclear reactor.

Nuclear fuel assembly 1 comprises a bundle of nuclear fuel rods 2 extending in a longitudinal direction L. Each rod 2 conventionally comprises metal cladding in which nuclear fuel pellets are stacked. The cladding is closed at its longitudinal extremities by plugs.

Nuclear fuel rods 2 are held in place in the bundle by means of a skeleton assembly comprising:

a plurality of spacer grids 3 distributed in the longitudinal direction L, guide tubes 4 located within the bundle of nuclear fuel rods 2 and assembled together with spacer grids 3, an upper end-piece 5a, and a lower end-piece 5b.

End-pieces 5a and 5b are rigidly attached to the extremities of guide tubes 4 which are longer than nuclear fuel rods 2.

Figure 2:
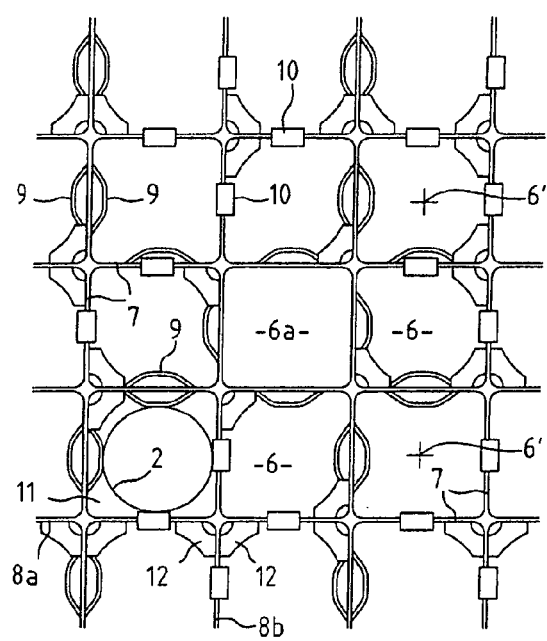
FIG. 2 is a diagrammatical partial view in plan of a spacer grid for the nuclear fuel assembly in FIG. 1 constructed according to the prior art.

Spacer grids 3 ensure that nuclear fuel rods 2 are held in place transversely and longitudinally and, as can be seen in FIG. 2, comprise cells 6 of square cross-section arranged in a regular square grid array. Each cell 6 comprises a peripheral belt of walls 7. Belt 7 has the shape of a solid rectangle on a square base which is open at its two extremities in the direction of axis 6' of cell 6. This axis 6' is perpendicular to the plane of FIG. 2, orientated longitudinally, and passes through the centre of the square cross-section of cell 6.

Peripheral belts 7 of cells 6 of spacer grid 3 comprise plates intersecting at right angles forming two families of plates 8a and 8b which are parallel to each other.

Plates 8a and 8b of the two families of plates are cut out from metal sheets, for example of zirconium alloy, and comprise slots half-way up at distances corresponding to the sides of cells 6 which enable them to be assembled through mutual engagement in arrangements at 90°, as illustrated in FIG. 2.

Plates 8a and 8b are then welded together along assembly lines comprising the edges of cells 6 of the spacer grid. Before assembly, plates 8a and 8b are cut and pressed out in order to form projecting dimples 9 within cells 6.

Plates 8a and 8b also comprise openings which are cut out at regular intervals in such a way that springs 10 which also project towards the interior of cells 6 can be fitted and secured. Each peripheral belt 7 comprises two adjacent walls at 90°, on each of which two dimples 9 spaced apart in the axial direction of the cell are constructed by cutting and pressing out the metal of the plates. The two other walls of belt 7 which are adjacent and at 90° to each other receive springs 10.

In this way six points of contact are provided within each of cells 6 for a nuclear fuel rod 2 inserted along axial direction 6' into a position substantially centered within cell 6.

The outside diameter of nuclear fuel rod 2 is smaller than the length of the side of a cell 6 in such a way that a free space 11 is provided about the outer cylindrical surface of rod 2, within peripheral belt 7 of cell 6 within which the rod is held in position substantially centered by dimples 9 and springs 10.

It will be seen in FIG. 2 that plates 8a and 8b comprising spacer grid 3 are cut out along their top edges to form fins 12 stirring the cooling water circulating within cells 6 in contact with the outer surface of nuclear fuel rods 2.

Stirring fins 12 are folded towards the interior of cells 6 in such a way as to direct the cooling water leaving each of cells 6 to an adjacent cell 6. This brings about an effect of stirring the circulating water in contact with each of nuclear fuel rods 2 in the longitudinal direction.

Figure 3:
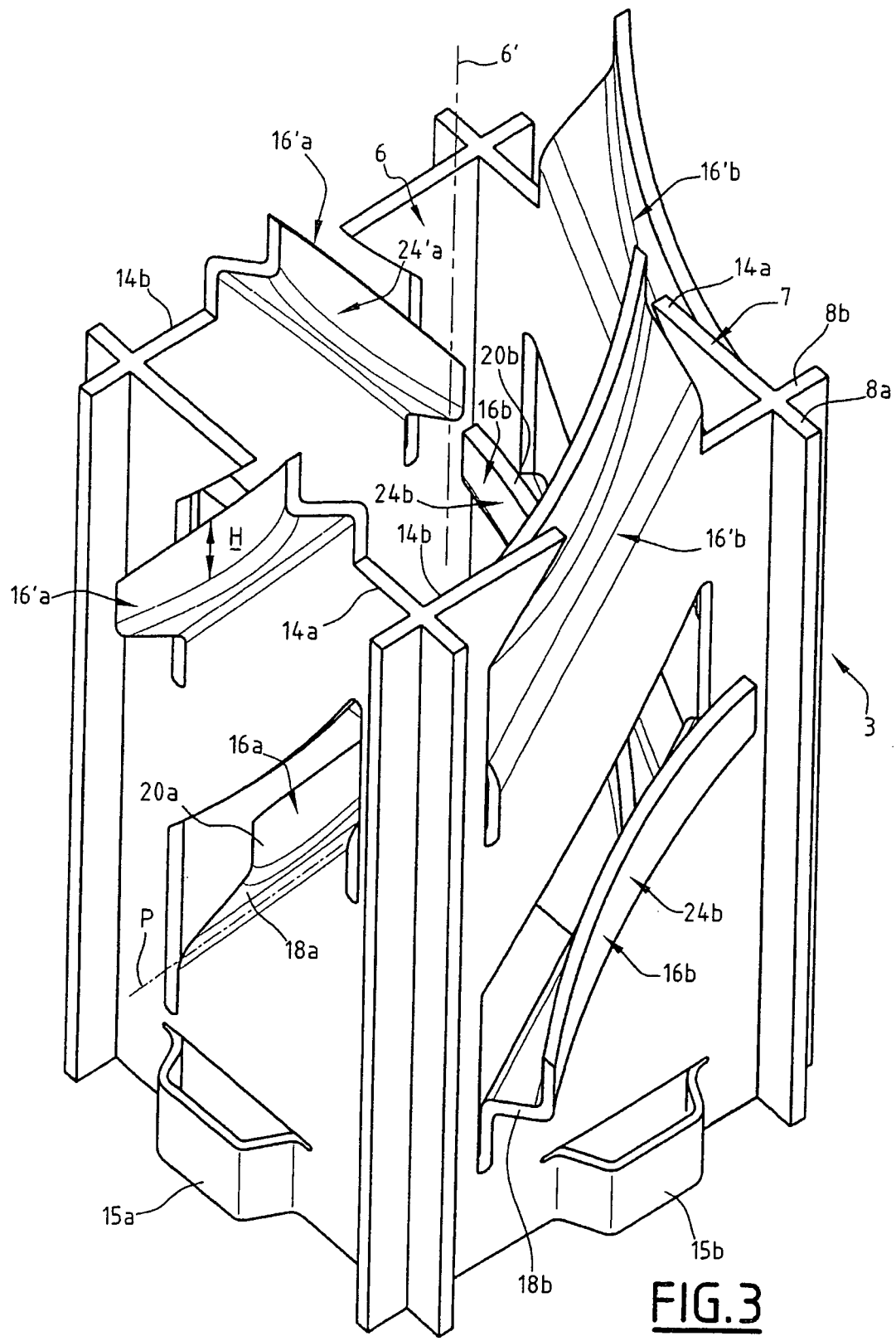
FIG. 3 is a diagrammatical perspective view of a cell of a spacer grid according to the invention before irradiation.

FIG. 3 shows a cell 6 of a spacer grid 3 according to the invention which can be used to replace a spacer grid according to the prior art as illustrated in FIG. 2.

In general spacer grid 3 in FIG. 3 is constructed in a similar way to spacer grid 3 in FIG. 2, that is from metal plates 8a and 8b which are assembled and secured at right angles by welding to form an array of cells 6 of square cross-section each of which is limited by the peripheral belt 7 of walls. Belt 7 is of a rectangular shape on a square base and its walls comprise portions of plates 8a and 8b assembled together at right angles.

Spacer grid 3 in FIG. 3 is more specifically a grid similar to that described in document FR-2 837 975 and its corresponding US-2005/226 358, the differences between that and the spacer grid in this document being however emphasized in the description which follows.

As all the cells 6 in spacer grid 3 have similar structures, apart from possibly cells 6 of spacer grid 3 in the outer peripheral layer, only the structure of cell 6 illustrated in FIG. 3 will be described below.

Peripheral belt 7 of cell 6 comprises two opposite walls 14a and two opposite walls 14b of similar shape except as far as the orientation of dimples 15a and 15b and supporting members 16a, 16b, 16'a and 16'b, which have been constructed therein by cutting and pressing out walls 14a and 14b, are concerned.

Only the structure of wall 14a located on the left-hand side in FIG. 3 will therefore be described below.

Two supporting members 16a and 16'a are provided one above the other by cutting and pressing out the metal of wall 14a. Lower supporting member 16a projects towards the interior of cell 6 in question, and supporting member 16'a projects towards the interior of an adjacent cell 6. Apart from their orientations these supporting members 16a and 16'a have similar structures and only that of lower supporting member 16a will be described below.

Supporting member 16a comprises a section 18a making a connection to the rest of wall 14a and a terminal contact part 20a of height H along the longitudinal direction.

Connecting section 18a is folded towards the interior of cell 6 with respect to the rest of wall 14a and contact part 20a is folded upwards in relation to connecting section 18a.

Connecting section 18a has been cut out in wall 14a obliquely with respect to axis 6' and is therefore folded in relation to the latter along a line P which is inclined by an angle of approximately 30° with respect to that axis 6'. More generally this inclination may have an absolute value which is strictly greater than 0° and strictly less than 90°.

Connecting section 18a therefore forms a helical blade substantially centered on axis 6'. Sections 18a and 18b of supporting members 16a and 16b provided in adjacent walls 14a and 14b are arranged as an extension of each other in such a way as to cause the flow of cooling water to wrap around rod 2 within cell 6. As in aforesaid documents FR-2 837 975 and US-2005/226 358, the directions in which the flow of water wraps in two adjacent cells 6 are opposite.

Contact part 20a bears on corresponding nuclear fuel rod 2 through the intermediary of its surface 20a which is orientated towards the interior of cell 6. The transverse cross-section of this surface can be seen in FIG. 4.

Figure 4:
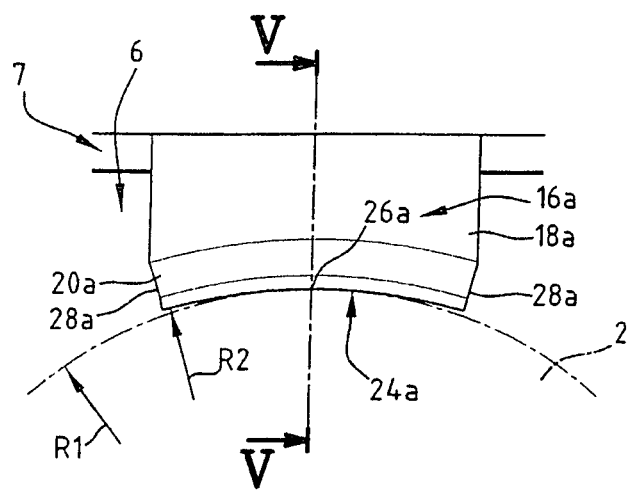
FIG. 4 is a diagrammatical partial view from above illustrating the contact between a supporting member of the spacer grid in FIG. 3 and a nuclear fuel rod.

As can be seen in FIG. 4, before irradiation inner surface 24a has a concave shape in a transverse plane, that is to say at right angles to central axis 6' of cell 6. More specifically this is in the shape of an arc of a circle.

Contrary to the state of the art, the transverse concavity of inner surface 24a is smaller than the transverse convexity of the outer surface of fuel rod 2 against which inner surface 24a bears. In other words, the transverse radius of curvature R2 of surface 24a, that is to say in the plane of FIG. 4, is strictly greater than the transverse radius of curvature R1 of the outer surface of corresponding nuclear fuel rod 2. It will be seen that in FIGS. 4 and 5 the outer surface of rod 2 is shown by dotted and dashed lines.

Typically transverse radius of curvature R1 of outer surface of nuclear fuel rod 2 in relation to central axis 6' is approximately 4.75 mm for fuel assembly 1 for a pressurized water reactor comprising 17×17 cells 6 per spacer grid 3 and the transverse radius of curvature R2 of inner surface 24a is for example approximately 6 mm.

More generally, R2 is strictly greater than 1.05×R1, that is strictly greater than 1.15×R1, and preferably strictly greater than 1.25×R1.

Thus inner surface 24a actually bears on the outer surface of nuclear fuel rod 2 corresponding to an area 26a of surface area 24a, this effective contact area 26a being substantially central and far from edges 28a of inner surface 24a. Lateral edges 28a may be rounded or beveled so as not to present an aggressive surface or a sharp edge which might come into contact with the cladding of fuel rod 2.

Figure 5:
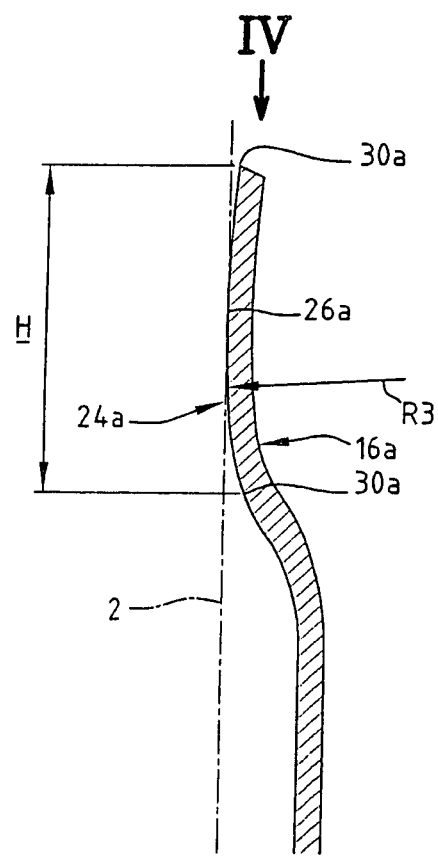
FIG. 5 is a diagrammatical partial view in longitudinal and radial cross-section along the line V-V in FIG. 4.

As illustrated in FIG. 5, before irradiation inner surface 24a has a convex shape in a longitudinal plane orientated radially with respect to central axis 6'. This convexity is not visible in FIG. 3 because of the scale of the illustration.

In the embodiment illustrated surface 24a has a curved shape with a radius of curvature R3 of approximately 23 mm in the plane of FIG. 5.

More generally, radius R3 will be less than 1000 mm and preferably between H/2 and $4H^2$, H being the height along the longitudinal direction of inner surface 24a of terminal part 20a of the supporting member.

Thus the effective contact area 26a is at a distance from the upper and lower edges 30a of inner surface 24a. Edges 30a may be rounded or beveled so as not to present an aggressive surface or a sharp edge which might come into contact with the cladding of fuel rod 2.

With its transverse concavity and longitudinal convexity inner surface 24a thus has the shape of a saddle.

This saddle shape, and the difference in transverse curvature between inner surface 24a and outer surface of corresponding rod 2, makes it possible to move the effective area of contact 26a away from the lateral edges 28a and longitudinal edges 30a of surface 24a so that the risks of piercing the cladding of nuclear fuel rod 2 by fretting are reduced.

This removal of contact area 26a away from lateral edges 28a and longitudinal edges 30a may be achieved with great certainty, despite manufacturing tolerances and dimensional changes in the components when in service. It will be seen that surface 24a retains its saddle shape and its difference in concavity with respect to rods 2 even after a stay in the reactor and despite the dimensional changes and deformations which this brings about.

In practice effective contact area 26a is initially in the form of a point but very quickly becomes an elliptical area through accommodation between surface 24a and the outer surface of corresponding rod 2. The area of this elliptical area also stabilizes quickly so that the kinetics of the wear on nuclear fuel rod cladding 2 becomes very small, even zero. This very large reduction in wear kinetics is due to the fact that the surface area of effective contact area 26a is very much greater than that achieved through cylinder/plane or cylinder/cylinder contact as in the state of the art and also because increasing the wear depth gives rise to a substantial increase in the area of the surfaces in contact.

In addition to this, the saddle shape encourages satisfactory positioning of nuclear fuel rod 2 in cell 6 and prevents it from being displaced transversely, inner surface 24a acting in a way as a nest.

It will also be seen that the longitudinal convexity of surface 24a makes it possible to reduce the risks of damaging rod 2 when it is inserted into cell 6, for example by vertical downward movement.

In the example described above, the longitudinal and radial cross-section of inner surface 24a, that is to say as seen in FIG. 5, is curved. However, it can be envisaged in particular variants that this cross-section might have other shapes and for example comprise a straight central portion extended by extremities which are themselves curved, that is that the convexity may be discontinuous. The transverse cross-section of inner surface 24a may also be discontinuous.

In the example described above supporting members 16a and 16b also bring about stirring of the water in the primary circuit through their sections 18a and 18b so that there is no need to provide additional stirring fins 12. However, it will be seen that the two features described, namely the saddle shape of inner surface 24a and the differences in transverse curvature between surface 24a and the outer surface of a rod 2, can be used in other types of supporting members and in particular in supporting members which do not have a stirring function.

These two features can therefore be used for all types of supporting members, whether they are rigid or resilient dimples or springs, regardless of their orientation with respect to longitudinal axis L.

It will also be noted that these two features can be used independently of each other insofar as both of them make it possible to limit the risks of damage through fretting and reduce sensitivity to manufacturing tolerances.

Likewise, these features, alone or in combination, may be envisaged only for particular types of support, or even only for particular spacer grids. The number and position of the supporting members in question may also be varied in relation to forms of construction.

It may therefore be decided to position such supporting members having the isolated or combined features in question according to specific needs, such as an increased risk of fretting or greater variability in manufacture, etc.

The features described above may be used in nuclear fuel assemblies intended for reactors other than pressurized water reactors, for example boiling water reactors.

The invention claimed is:

1. A nuclear fuel assembly for a light water reactor comprising:
    nuclear fuel rods extending in a longitudinal direction; and
    a skeleton assembly holding the nuclear fuel rods in place, the skeleton assembly including spacer grids, each spacer grid delimiting a substantially regular array of cells housing the nuclear fuel rods, each cell being surrounded by a peripheral belt of walls and having a central longitudinal axis which is substantially the same as the axis of the nuclear fuel rod housed in the cell, each spacer grid further comprising supporting members projecting into the cells from the peripheral belt of walls, the supporting members comprising contact parts having surfaces orientated towards the interior of the cells abutting against the nuclear fuel rods, the inner surface of at least one supporting member having, before irradiation, a concave shape in a plane transverse to the longitudinal direction, the supporting members further comprising a helical blade for stirring the nuclear reactor cooling fluid, the helical blade being substantially centered on the central axis of the corresponding cell and connecting the contact part to the peripheral belt of walls of the corresponding cell, the contact part constituting a terminal part of the supporting member and being folded with respect to the helical blade, the helical blade being folded with respect to the peripheral belt of walls, the contact part extending between a lower edge and an upper edge of the cell, wherein the inner surface of the contact part of the said supporting member also has, before irradiation, a convex shape curved in a longitudinal plane orientated radially with respect to the central axis of the corresponding cell between the lower edge and the upper edge thereof.

2. The assembly according to claim 1 wherein the inner surface of the supporting member has, before irradiation, a concave shape in a plane transverse to the longitudinal direction, with a transverse radius of curvature being greater than a transverse radius of curvature of the outer surface of the nuclear fuel rod housed in the corresponding cell.

3. The assembly according to claim 2 wherein the transverse radius of curvature of the inner surface is greater than 1.05 times the transverse radius of curvature-of the outer surface of the nuclear fuel rod housed in the corresponding cell.

4. The assembly according to claim 2 wherein the transverse radius of curvature of the inner surface is greater than 1.15 times the transverse radius of curvature of the outer surface of the nuclear fuel rod-housed in the corresponding cell.

5. The assembly according to claim 2 wherein the transverse radius of curvature of the inner surface is greater than 1.25 times the transverse radius of curvature of the outer surface of the nuclear fuel rod housed in the corresponding cell.

6. The assembly according to claim 1 wherein the inner surface of the contact part of the supporting member has, before irradiation, the convex shape in the longitudinal plane orientated radially with respect to the central axis of the cell with a longitudinal radius of curvature of less than 1000 mm.

7. The assembly according to claim 6 wherein the longitudinal radius of curvature is between $H/2$ and $4H^2$ where $H$ is a height along the longitudinal direction of the inner surface of the supporting member.

8. The assembly according to claim 1 wherein each supporting member includes a first longitudinal edge attached to the corresponding wall and second longitudinal edge that is a free edge spaced away from the corresponding wall, the convex shape curved in the longitudinal plane being between the first and second longitudinal edges.

9. The assembly according to claim 8 wherein each supporting member includes lateral edges, the supporting members being shaped such that the lateral edges and the second longitudinal edge are spaced away from an effective contact area between each supporting member and the corresponding nuclear fuel rod.

* * * * *